United States Patent
Weber et al.

(10) Patent No.: US 7,502,663 B2
(45) Date of Patent: Mar. 10, 2009

(54) CORRECTION METHOD FOR CHIP REMOVAL MACHINES

(75) Inventors: Christoph Weber, Biedenkopt-Wallan (DE); Gunter Schneider, Marburg (DE)

(73) Assignee: Schneider GmbH & Co. KG, Steffenberg (DE)

( * ) Notice: Subject to any disclaimer, the term of this patent is extended or adjusted under 35 U.S.C. 154(b) by 0 days.

(21) Appl. No.: 10/582,623

(22) PCT Filed: Apr. 20, 2005

(86) PCT No.: PCT/EP2005/051746

§ 371 (c)(1),
(2), (4) Date: Jun. 12, 2006

(87) PCT Pub. No.: WO2005/103849

PCT Pub. Date: Nov. 3, 2005

(65) Prior Publication Data

US 2007/0124013 A1     May 31, 2007

(30) Foreign Application Priority Data

Apr. 21, 2004   (DE) .................. 10 2004 019 931

(51) Int. Cl.
*G06F 19/00* (2006.01)
(52) U.S. Cl. .................. 700/187; 700/160; 700/170; 700/173; 700/174; 700/193; 700/194; 702/150
(58) Field of Classification Search .................. 700/30, 700/45, 159, 160, 164, 170, 173, 174, 175, 700/186, 187, 192–195, 302, 190; 702/150–153
See application file for complete search history.

(56) References Cited

U.S. PATENT DOCUMENTS

| 3,474,231 | A |   | 10/1969 | Laube |
| 5,903,474 | A | * | 5/1999 | Sadler et al. .................. 703/2 |

FOREIGN PATENT DOCUMENTS

| CH | 425 958 | 9/1957 |
| DE | 2 253 014 | 5/1973 |
| DE | 25 37 630 | 3/1976 |
| DE | 31 51 173 | 7/1983 |
| DE | 39 02 840 | 8/1990 |
| DE | 39 14549 | 11/1990 |
| DE | 44 12 370 | 10/1995 |
| DE | 199 19 147 | 11/2000 |
| EP | 0 854 769 | 7/1998 |
| WO | 02/37168 | 5/2002 |

* cited by examiner

*Primary Examiner*—Sean P Shechtman
(74) *Attorney, Agent, or Firm*—Hudak, Shunk & Farine Co. LPA

(57) ABSTRACT

A method for determining a deviation of at least one regulating variable on chip removal machines with a mechanical drive for a tool and/or a workpiece, regulated by a control system, wherein the regulation comprises a plurality of values of at least three spatial axes for the control system and for the drive, and the values have a functional relation with the axes. A protocol is prepared from a plurality of control system actual values detected by measuring devices and/or selected drive actual values and a control system nominal value and/or a drive nominal value is calculated at least in relation to an axis, and a control system differential value and/or a drive differential value is calculated at least in relation to the axis. A chip removal machine which implements such a method is disclosed.

18 Claims, 2 Drawing Sheets

CORRECTION METHOD FOR CHIP REMOVAL MACHINES

FIELD OF THE INVENTION

The invention concerns a method for determining a deviation of at least one regulating variable on chip removal machines with a mechanical drive for a tool and/or a workpiece, regulated by a control system, wherein the regulation comprises a plurality of values C, X, Z of at least three spatial axes c, x, z for the control system and for the drive, and the values C, X, Z have a functional relation such as $Z=f_{bi}(C, X)$ with the axes c, x, z.

BACKGROUND OF THE INVENTION

It is already generally known, especially for production processes in progress, how to compare the nominal values which are preset or calculated by a control system to the actual values of the tool so as to perform an adjustment of the actual values. Such is also described by CH 425 958. In highly dynamic processes with several functionally interrelated axes, however, this regulating procedure is not applicable, since for example it takes around four working and computing clock periods from the time the control system sends the nominal value to the drive, until the actual positioning of the drive occurs. As a rule, furthermore, the control system produces a separate pilot value, which influences the settings of the drive or the control current of the drive in the desired manner. Thus, the nominal values and the respective actual values can no longer be matched up and compared.

Thus far, the work piece after being manufactured has been optically or mechanically measured, thus drawing a conclusion as to any deviations during the manufacturing process.

WO 02/37168 A describes a method for controlling a 4-axis (Z, Z', C, X) chip removal machine, in which a functional relation of the form $Z=f(C, X)$ exists. It describes a "feedforward" control system which does not envision the differential value of the invention.

SUMMARY OF THE INVENTION

The basic aim of the invention is to configure and arrange a machining process such that an optimal representation of the deviation between the nominal value and the actually generated workpiece value is assured.

This aim is achieved, according to the invention, in that a protocol is prepared from a plurality of control system actual values ($C_{p,s}$, $X_{p,s}$, $Z_{p,s}$) detected by measuring means and/or selected drive actual values ($C_{p,a}$, $X_{p,a}$, $Z_{p,a}$), and a control system nominal value according to $Z_{bi,s}=f_{bi}(C_{p,s},X_{p,s})$ and/or a drive nominal value according to $Z_{bi,a}=f_{bi}(C_{p,a},X_{p,a})$ is calculated at least in relation to the z-axis, and a control system differential value according to $D_{z,s}=Z_{p,s}-Z_{bi,s}$ and/or a drive differential value according to $D_{z,a}=Z_{p,a}-Z_{bi,a}$ is calculated at least in relation to the z-axis. A similar situation is provided for the c-axis and the x-axis. It should be noted that the nominal value, such as $Z_{bi,a}$, is calculated by using the respective protocol value, i.e., the actual value, such as $C_{p,a}$ and $X_{p,a}$.

As a result, the actual value of one axis is compared with the calculated nominal value of this axis on the basis of the actual values of the other axes, taking into consideration their functional relation $f_{bi}$.

This actual value comes very close to the physical value such as might be ascertained only individually by a subsequent measurement technique, for example, by mechanical sensing, or by an optical measurement method like a hologram. But the small number of measured points during mechanical sensing does not let one evaluate minor errors, such as those caused by the static friction of a defective axial bearing of the machine, since no such resolution is possible.

Moreover, the optical measurement technique is extremely time-consuming and tedious, so that the number of different workpieces or the variation in production is very limited.

Provision is made so that at least one spatial axis can be configured as a translatory spatial axis x, z and at least one spatial axis as a rotary spatial axis c.

For this, it is also advantageous to determine, at least for the drive and the z-axis, a contouring differential value according to $D_{z,a}^{\Phi}=Z_{p,a}-Z_{bi,a}^{\Phi}$ with $Z_{bi,a}^{\Phi}=f_{bi}(C_{p,a}+\Delta\phi, X_{p,a})$, where the value $\Delta\phi$ corresponds to a phase shift of the c-axis. Thus, the influence of a continuous or constant phase shift $\Delta\phi$ of the c-axis is left out of consideration when assessing the quality of the cutting process. This phase shift $\Delta\phi$ after all results merely in a torsion of the generated lens contour starting from a theoretical initial position, and the torsion can be equalized by a correction of the mounting position of the lens thus produced.

An additional possibility, according to a further modification, is that the phase shift $\Delta\phi$ is between 0.5° and 3°, especially 1.0°, and the determination of $Z_{bi,a}^{\Phi}$ is done between $+\Delta\phi$ and $-\Delta\phi$ with an increment between 0.05° and 0.2°, especially 0.1°. This provides a sufficient resolution for identification of a contouring error.

Moreover, it is advantageous to compute, at least from the differential values $D_{z,s}$, $D_{z,a}$ and/or the contouring differential values $D_{z,a}^{\Phi}$ at least for the z-axis, one peak-to-valley value for the control system according to $D_{z,s,ptv}=D_{z,s,max}-D_{z,s,min}$ and for the drive according to $D_{z,a,ptv}=D_{z,a,max}-D_{z,a,min}$, $D_{z,a\ ptv}^{\Phi}=D_{z,a,max}^{\Phi}-D_{z,a,min}^{\Phi}$, where $D_{z,s/a,min}$ corresponds to the minimum and $D_{z,s/a,max}$ to the maximum differential value of the respective measurement and $D_{z,a,max}^{\Phi}$, $D_{z,a,min}^{\Phi}$ corresponds to the respective position of the c-axis, taking into account $+/-\Delta\phi$. Similar provision is also made for the other axes.

It is also advantageous to determine an error differential value according to $D_{z,a}^{f}=Z_{p,a}-Z_{bi,a}^{f}$ with $Z_{bi,a}^{f}=f_{bi}(C_{p,s}, X_{p,s})$ at least for the drive and at least in relation to the z-axis. The error differential value $D_{z,a}^{f}$ is a measure of the deviation of the respective cutting process, and it also makes it possible to identify other factors of influence of the machine, such as bearing fault. Similar provision is also made for the control system and the other axes.

Provision is made for the function $f_{bi}$ to be a 3D bicubic surface spline and/or spiral spline. Thanks to the polynomial coefficients which are known at each lattice point of the surface spline, any given point in the lattice of the surface spline can be computed.

The spiral spline is computed in terms of the polynomial coefficients, starting at different lattice points of the surface spline.

It is of significance to the invention that the differential values $D_{z,a}$, $D_{z,s}$, the contouring differential values $D_{z,a}^{\Phi}$, the respective peak-to-valley values $D_{z,a,ptv}$, $D_{z,s,ptv}$, $D_{z,a\ ptv}^{\Phi}$ and/or the actual value $Z_{p,s}$, $Z_{p,a}$ of at least the z-axis are represented, and at least the representation of $D_{z,a,ptv}$, $D_{z,s,ptv}$, and/or $D_{z,a\ ptv}^{\Phi}$ is done with the smallest possible peak-to-valley value. The other measurement values, which are based on a different phase shift $\Delta\phi$ or a different contouring error of the c-axis, are disregarded, as mentioned above. This phase shift $\Delta\phi$ can be taken into account through the mounting position. Similar provision is also made for the control system and the other respective axes.

In conjunction with the configuration and arrangement of the invention, it is advantageous to represent the size and/or the deviation of at least the peak-to-valley value $D_{z,s,ptv}$, $D_{z,a,ptv}$, $D_{z,a}{}^\Phi{}_{ptv}$ and/or the actual value $Z_{p,s}$, $Z_{p,a}$ in terms of the respective workpiece position. This representation can be done by a contour line and/or a contour spiral, specifying the angle and the radius.

Moreover, it is advantageous to distinguish optically between negative and positive values and/or optically in terms of the magnitude of the values when representing the differential value and/or the contouring differential value $D_{z,a}$, $D_{z,s}$, $D_{z,a}{}^\Phi$. It is especially advantageous to use optically graduated intensity levels for positive and/or negative differential values and/or contouring differential value $D_{z,a}$, $D_{z,s}$, $D_{z,a}{}^\Phi$ with different color tones in terms of their magnitude. Positive differential values and/or the contouring differential value $D_{z,a}$, $D_{z,s}$, $D_{z,a}{}^\Phi$ could be graduated from yellow to red according to their magnitude, for example, and negative differential values and/or the contouring differential value $D_{z,a}$, $D_{z,s}$, $D_{z,a}{}^\Phi$ from green to blue according to their magnitude. Other color grades are also envisioned. In addition, a graduation in terms of different samples in the manner of the sample embodiment is provided.

Moreover, it is advantageous to provide a superimposed representation of the differential value and/or the contouring differential value $D_{z,a}$, $D_{z,s}$, $D_{z,a}{}^\Phi$ and the actual value $Z_{p,s}$, $Z_{p,a}$, the respective scale being different for the two values. Whereas the absolute actual value $Z_{p,s}$, $Z_{p,a}$ varies in the range of a few millimeters, the differential values $D_{z,a}$, $D_{z,s}$, $D_{z,a}{}^\Phi$ are in micrometers, i.e., lower by a factor of 1000. The representation in FIG. 2 is nevertheless informative.

Furthermore, it is advantageous to calculate, for one or more other axes x, c, the nominal values $C_{bi}$, $X_{bi}$, the differential values $D_{x/c,a}$, $D_{x/c,s}$, the peak-to-valley value $D_{x/c,a,ptv}$, $D_{x/c,a}{}^\Phi{}_{ptv}$, $D_{x/c,s,ptv}$, $D_{x/c,s}{}^\Phi{}_{ptv}$, the error differential value $D_{x/c,a}{}^f$, $D_{x/c,s}{}^f$ and/or the contouring differential value $D_{x/c,a}{}^\Phi$, $D_{x/c,a}{}^\Phi$ for the control system and/or for the drive. This makes possible a comprehensive evaluation of the cutting process outcome.

Finally, it is advantageous to provide for a correction cut, in addition to a main cut and an optional precision cut during the chip removal machining of the workpiece, at least making use of the differential values $D_{z,a}$, $D_{z,s}$, $D_{z,a}{}^\Phi$. Besides the possibility of using the above-described method for adjusting the various parameters of the chip removal or cutting machine, one can provide for an additional correction cut after a main cut, which generally constitutes the end of the cutting machining. The correction cut can then retroactively machine at least the positive deviations of the workpiece.

For this, it is also especially advantageous to use the above-mentioned method for a chip removal machine for the production of optical lenses from plastic.

Finally, it is advantageous to convert the values C, X, Z of the axes c, x, z into the Cartesian system of coordinates or into the polar system of coordinates. Switching between the different coordinate systems allows one to handle the most varied customer and manufacturer data.

In this case, it is advantageous to start from a theoretical cutting point of an ideal point-like tool and convert the values C, X, Z of the axes c, x, z for use of a circular carbide tip, with the circular carbide tip having a center point corresponding to the theoretical cutting point. This so-called off-set data constitutes the basis for the above-mentioned surface spline, which thereby determines the off-set surface serving as the basis for the spiral spline.

It is advantageous to use at least one differential value $D_{z,a}$ and/or one contouring differential value $D_{z,a}{}^\Phi$ as an exclusion criterion for the control system's actual values ($C_{p,s}$, $X_{p,s}$, $Z_{p,s}$) and/or as an adjustment criterion for the various machine parameters and the machine's control system.

The invention also pertains to a chip removal machine 10, see FIG. 3, with a mechanical drive 6 for a tool 7 and/or a workpiece 1, regulated by a control system 5, wherein the regulation comprises a plurality of values C, X, Z of at least three spatial axes c, x, z for the control system 5 and for the drive 6, and the above-described method is used for determining the deviation of the regulating variables.

It is advantageous to provide an output unit for the representation of the above-described values, especially the differential values $D_{z,a}$ and/or the contouring differential value $D_{z,a}{}^\Phi$.

BRIEF DESCRIPTION OF THE DRAWINGS

Additional benefits and details of the invention are discussed in the patent claims and in the specification, and presented in the figures. These show:

DETAILED DESCRIPTION OF THE INVENTION

Figure 1:
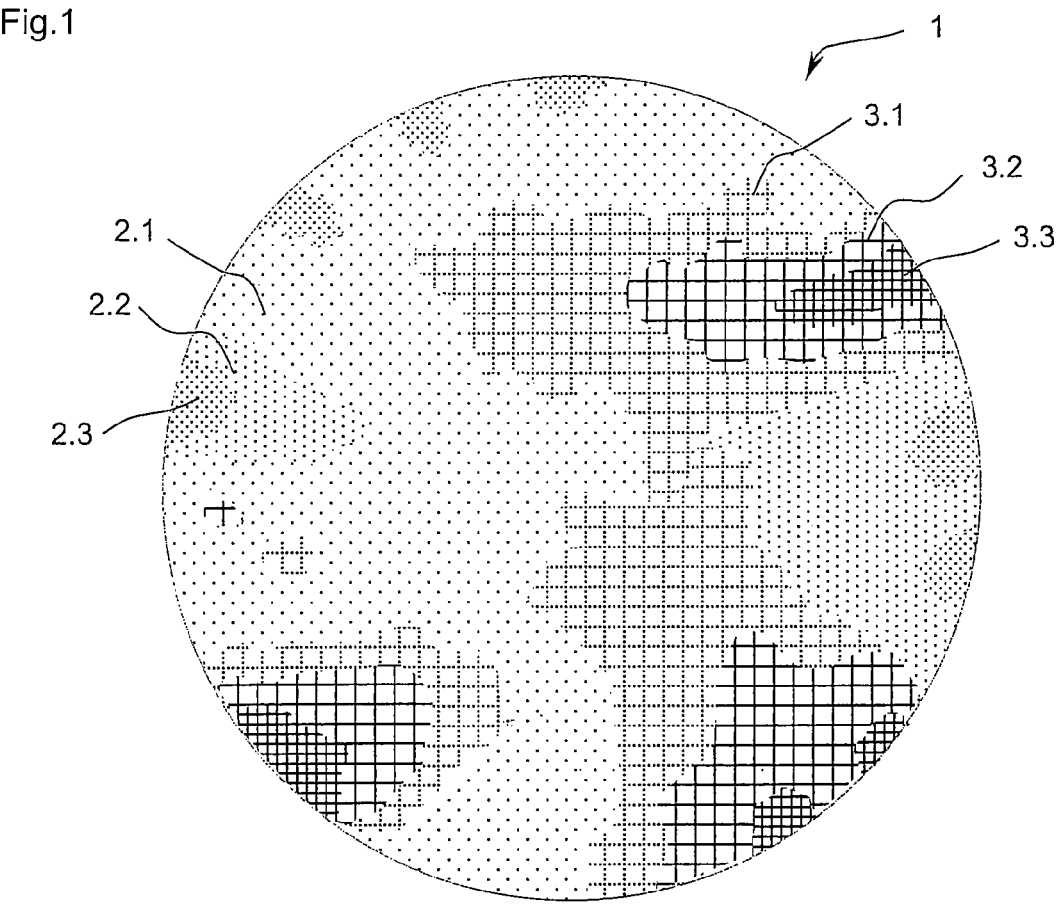
FIG. 1, a representation of the differential values of a lens surface.

A workpiece or optical lens 1 depicted in FIG. 1 has an actual surface that deviates from the nominal surface and thus contains an error.

Given a nominal surface, not shown here, the surface depicted here has various regions 2.1-2.3, 3.1-3.3, in which the actual value differs from the theoretical nominal value. The regions indicated by 2.1-2.3, i.e., the dotted surfaces, are positive deviations 2 from the nominal value, and the regions 3.1-3.3, i.e., the checkered regions, are negative deviations 3 from the nominal value.

Besides the fundamental distinction between positive 2.1-2.3 and negative 3.1-3.3 deviations, i.e., positive and negative differential values, the respective differential values are also graduated by magnitude. Thus, as regards the positive differential values, in addition to the regions with a deviation of $1^{st}$ degree (2.1) there are also regions with a deviation of $2^{nd}$ degree (2.2) and $3^{rd}$ degree (2.3). The various degrees of graduation in this method of representation with essentially separate and different samples involve different regions of deviation values, which are assigned at least optically to the respective degree of deviation. In the case of a color gradation, not represented here, the different degrees of deviation are less digitized or pass smoothly into each other.

In corresponding fashion, for the negative differential values, shown checkered, there are likewise regions with deviations of $1^{st}$ degree (3.1), deviations of $2^{nd}$ degree (3.2) and deviations of $3^{rd}$ degree (3.3).

In a sample embodiment, not shown, provision is also made to have other digitized degrees of deviation besides these degrees of deviation, thereby ensuring a higher resolution for this differential value structure.

Figure 2:
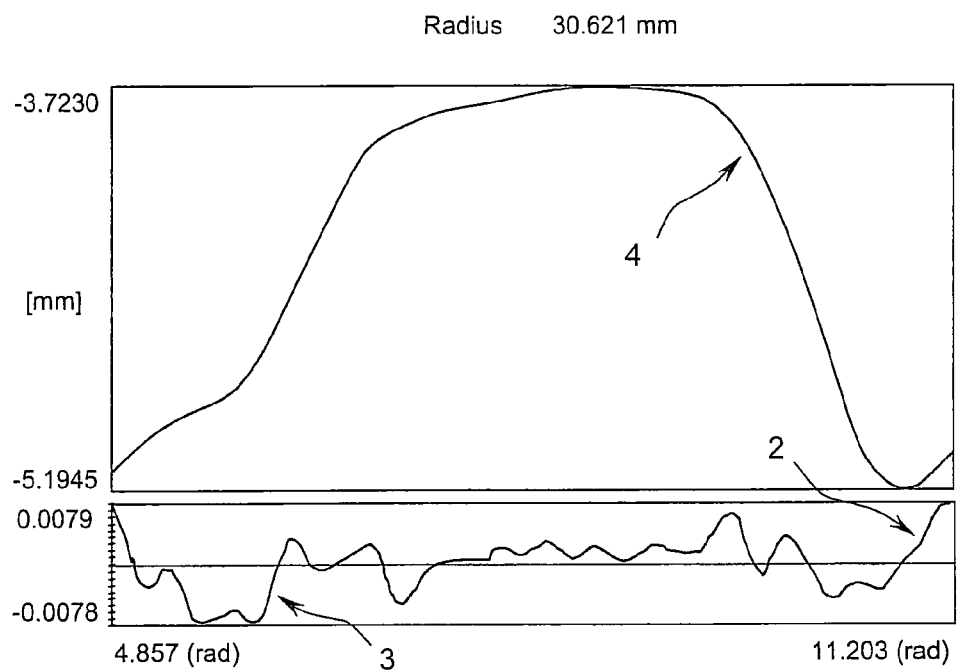
FIG. 2, the representation of the z-value with the representation of the corresponding differential value.
Figure 3:
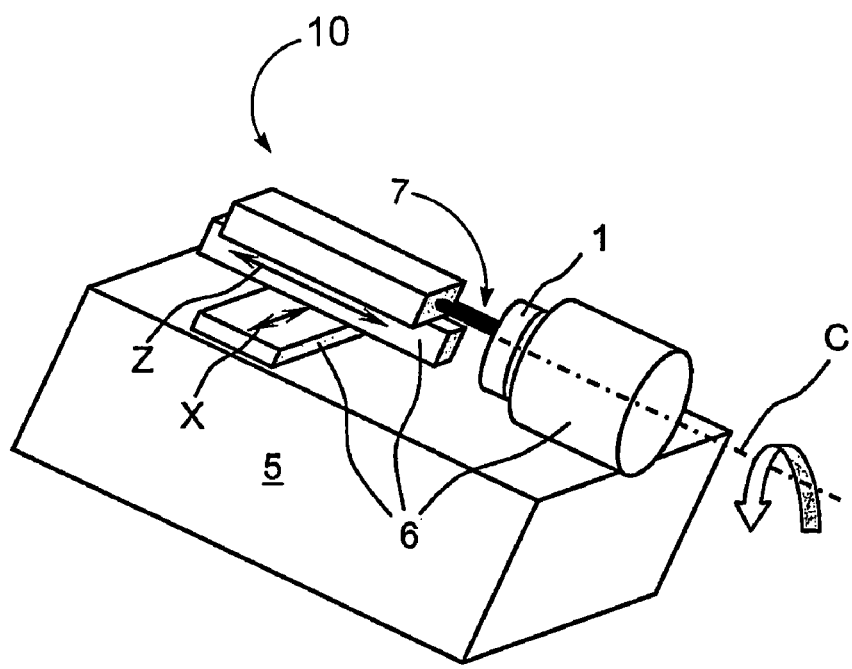
FIG. 3, one embodiment of a chip removal machine according to the present invention.

The diagram presented in FIG. 2 shows the z-value 4 of the lens 1 depicted in FIG. 1, first absolutely (top diagram) and secondly the respective differential value relative to the nominal value (bottom). There is a different scale used in the two representations, due to the very different size of the z-value 4 and of the differential value in terms of magnitude. The z-value 4 shown here is based on an outer radius of 30.621 mm, i.e., near the margin of the lens with a diameter of around 60 mm. Based on a starting value of 0.0, corresponding to the unmachined blank, the actual z-value 4 depicted here travels in a region between 3.723 mm and 5.194 mm beneath the former 0-level. The corresponding differential value, i.e., the deviation value of the depicted actual z-value 4, ranges between 7.9 μm above and 7.8 μm below the nominal z-value 4. In a sample embodiment, not shown, a superimposed representation is provided for the two values, at least for a partial region and with sufficient scale.

LIST OF REFERENCE SYMBOLS 1 workpiece
2 positive deviation
2.1 positive deviation of $1^{st}$ degree
2.2 positive deviation of $2^{nd}$ degree
2.3 positive deviation of $3^{rd}$ degree
3 negative deviation
3.1 negative deviation of $1^{st}$ degree
3.2 negative deviation of $2^{nd}$ degree
3.3 negative deviation of $3^{rd}$ degree
4 z-value
5 control system
6 mechanical drive
7 tool
10 chip removal machine

The invention claimed is:

1. A method for determining a deviation of at least one regulating variable on a chip removal machine with a mechanical drive for a tool or a workpiece or a combination thereof, regulated by a control system, wherein the regulation comprises a plurality of values C, X, Z of at least three spatial axes c, x, z for the control system and for the drive, and the values C, X, Z have a functional relation $f_{bi}$ with the axes c, x, z, comprising the steps of:
   a) preparing a protocol from a plurality of control system actual values C.sub.p,s, X.sub.p,s, Z.sub.p,s detected by measuring means or selected drive actual values C.sub.p,a, X.sub.p,a, Z.sub.p,a or combinations thereof,
   b) calculating a control system nominal value $Z_{bi,s} = f_{bi}(C_{p,s}, X_{p,s})$ or a drive nominal value $Z_{bi,a} = f_{bi}(C_{p,a}, X_{p,a})$ or a combination thereof at least in relation to the z-axis,
   c) calculating a control system differential value $D_{z,s} = Z_{p,s} - Z_{bi,s}$ or a drive differential value $D_{z,a} = Z_{p,a} - Z_{bi,a}$ or combinations thereof at least in relation to the z-axis; and
   d) determining for at least for the drive and the z-axis a contouring differential value $D_{z,a}^{\phi} = Z_{p,a} - Z_{bi,a}^{\phi}$ with $Z_{bi,a}^{\phi} = f_{bi}(C_{p,a} + \Delta\phi, X_{p,a})$, where the value $\Delta\phi$ corresponds to a phase shift of the c-axis, which results in a torsion of generated lens contour.

2. The method according to claim 1, wherein the phase shift $\Delta\phi$ is between 0.5° and 3°, and the determination of $Z_{bi,a}^{\phi}$ is done between $+\Delta\phi$ and $-\Delta\phi$ with an increment between 0.05° and 0.2°.

3. The method according to claim 1, wherein one computes, at least from the differential values $D_{z,s}$, $D_{z,a}$ or the contouring differential values $D_{z,a}^{\phi}$ or a combination thereof at least for the z-axis, one peak-to-valley value for the control system $$D_{z,s,ptv} = D_{z,s,max} - D_{z,s,min}$$

and peak-to-valley values for the drive $$D_{z,a,ptv} = D_{z,a,max} - D_{z,a,min},$$

$$D_{z,a}^{\phi}{}_{ptv} = D_{z,a,max}^{\phi} - D_{z,a,min}^{\phi},$$

where $D_{z,s/a,min}$ corresponds to the minimum and $D_{z,s/a,max}$ to the maximum differential value of the respective measurement and $D_{z,a,max}^{\phi}$, $D_{z,a,min}^{\phi}$ corresponds to the respective position $\phi$, $+\Delta\phi$ and $-\Delta\phi$ of the c-axis, taking into account $+/-\Delta\phi$.

4. The method according to claim 1, wherein one determines an error differential value according to $$D_{z,a}^{f} = Z_{p,a} - Z_{bi,a}^{f}$$

with $$Z_{bi,a}^{f} = f_{bi}(C_{p,s}, X_{p,s})$$

at least for the drive and at least in relation to the z-axis.

5. The method according to claim 1, wherein the function $f_{bi}$ is a 3D bicubic surface spline or a spiral spline or a combination thereof.

6. The method according to claim 3, wherein the differential values $D_{z,a}$, $D_{z,s}$, the contouring differential values $D_{z,a}^{\phi}$, the respective peak-to-valley values $D_{z,s,ptv}$, $D_{z,a,ptv}$, $D_{z,a}^{\phi}{}_{ptv}$ or the actual value $Z_{p,s}$, $Z_{p,a}$ of at least the z-axis or combinations thereof are represented, and at least one or more of the representation of $D_{z,s,ptv}$, $D_{z,a,ptv}$, and $D_{z,a}^{\phi}{}_{ptv}$ is done with the smallest possible peak-to-valley value.

7. The method according to claim 3, wherein the size or the deviation or a combination thereof of at least the peak-to-valley value $D_{z,s,ptv}$, $D_{z,a,ptv}$, $D_{z,a}^{\phi}{}_{ptv}$ or the actual values $Z_{p,s}$, $Z_{p,a}$ or a combination thereof is represented in terms of the respective workpiece position.

8. The method according to claim 6, wherein one distinguishes optically between negative and positive values when representing the differential value or the contouring differential value $D_{z,a}$, $D_{z,s}$, $D_{z,a}^{\phi}$ or optically in terms of the magnitude of the values or combinations thereof.

9. The method according to claim 6, wherein positive or negative or a combination thereof differential values or contouring differential values $D_{z,a}$, $D_{z,s}$, $D_{z,a}^{\phi}$ or a combination thereof are optically graduated by different color tones in terms of their magnitude or by different color tone intensities in terms of the magnitude of the values or a combination thereof.

10. The method according to claim 6, wherein one provides for a superimposed representation of the differential value and the contouring differential value $D_{z,a}$, $D_{z,s}$, $D_{z,a}^{\phi}$ and the actual value $Z_{p,s}$, $Z_{p,a}$, the respective scale being different for the two values.

11. The method according to claim 1, wherein one calculates, for one or more other axes x, c, the nominal values $C_{bi}$, $X_{bi}$, the differential values $D_{x/c,a}$, $D_{x/c,s}$, the peak-to-valley values $D_{x/c,a,ptv}$, $D_{x/c,a}^{\phi}{}_{ptv}$, $D_{x/c,s,ptv}$, $D_{x/c,s}^{\phi}{}_{ptv}$, one or more of error differential value $D_{x/c,a}^{f}$, $D_{x/c,s}^{f}$ and/or the contouring differential value $D_{x/c,s}^{\phi}$, $D_{x/c,a}^{\phi}$, or a combination thereof for the control system or for the drive or a combination thereof.

12. The method according to claim 1, wherein one provides for a correction cut, in addition to a main cut and an optional precision cut during the chip removal machining of the workpiece, at least making use of the differential values $D_{z,a}$, $D_{z,s}$, $D_{z,a}^{\phi}$.

13. The method for a chip removal machine for the production of optical lenses from plastic according to claim 1.

14. The method according to claim 1, wherein one converts the values C, X, Z of the axes c, x, z into the Cartesian system of coordinates or into the polar system of coordinates.

15. The method according to claim 1, wherein one starts from a theoretical cutting point of an ideal point-like tool and convert the values C, X, Z of the axes c, x, z for use of a circular carbide tip, with the circular carbide tip having a center point corresponding to the theoretical cutting point.

16. The method according to claim 1, wherein one uses at least one differential value $D_{z,a}$ or one contouring differential value $D_{z,a}^{\Phi}$ or a combination thereof as an exclusion criterion for the control system's actual values C.sub.p,s, X.sub.p,s, Z.sub.p,s or as an adjustment criterion or a combination thereof for the various machine parameters and the machine's control system.

17. A chip removal machine comprising: a mechanical drive for a tool or a workpiece or a combination thereof, regulated by a control system, wherein the regulation comprises a plurality of values C, X, Z of at least three spatial axes c, x, z for the control system and for the drive, wherein the values C, X, Z have a functional relation $f_{bi}$ with the axes c, x, z, wherein a method is used to determine the deviation of the regulating variables by a) preparing a protocol from a plurality of control system actual values $C_{p,s}$, $X_{p,s}$, $Z_{p,s}$ detected by measuring means or selected drive actual values $C_{p,a}$, $X_{p,a}$, $Z_{p,a}$ or a combination thereof, b) calculating a control system nominal value according to $Z_{bi,s} = f_{bi} (C_{p,s}, X_{p,s})$ or a drive nominal value according to $Z_{bi,a} = f_{bi} (C_{p,a}, X_{p,a})$ or a combination thereof at least in relation to the z-axis, c) calculating a control system differential value according to $D_{z,s} = Z_{p,s} - Z_{bi,s}$ or a drive differential value $D_{z,a} = Z_{p,a} - Z_{bi,a}$ or combinations thereof at least in relation to the z-axis, and d) determining for at least for the drive and the z-axis a contouring differential value $D_{z,a}^{\Phi} = Z_{p,a} - Z_{bi,a}^{\Phi}$ with $Z_{bi,a}^{\Phi} = f_{bi} (C_{p,a} + \Delta\phi, X_{p,a})$ where the value $\Delta\phi$ corresponds to a phase shift of the c-axis, which results in a torsion of generated lens contour.

18. The chip removal machine according to claim 17, wherein an output unit is provided for the representation of the values, and wherein the function $f_{bi}$ is a 3D bicubic surface spline or a spiral spline or a combination thereof.

* * * * *